Nov. 14, 1961 V. M. BRYANT, JR 3,009,007
GALVANIC CELL
Filed July 30, 1958

Vivian M. Bryant, Jr.
INVENTOR.

BY
ATTORNEYS

3,009,007
GALVANIC CELL
Vivian M. Bryant, Jr., Rochester, N.Y., assignor to Eastman Kodak Company, Rochester, N.Y., a corporation of New Jersey
Filed July 30, 1958, Ser. No. 752,062
15 Claims. (Cl. 136—90)

This invention relates to an improved galvanic cell, and particularly to such a cell of the type utilizing ammonia as the solvent for the solute used in the electrolyte.

Galvanic cells using ammonia as the electrolyte solvent have been found to be exceptionally well suited for certain applications wherein reliable operation must be had over an extremely wide range of temperatures. Such cells have been found to operate effectively at temperatures ranging from −70° F. to +160° F. However, the field of application of such cells has been considerably restricted by the fact that such cells, as have heretofore been known, once activated, have had a relatively short life. Thus, it has been necessary to store these cells in their inactivated condition, the customary procedure being to delay adding the ammonia used as the electrolyte solvent until just prior to the intended use of the cell. However, even then, once the cells were activated, the useful life was of very short duration, whether the cell was used to supply current or whether it was merely standing ready for use.

Another deficiency of known cells of this type is that their voltage-time discharge characteristics have been quite poor, the cell output voltage frequently falling off to substantially half of its initial value before the end of the cell's useful capacity had been reached. This variation in output voltage likewise seriously limited the field of application of such cells.

It is an object of this invention to provide a cell of this type using ammonia as the electrolyte solvent, which will retain the desired characteristics of the previously known cells and which will, at the same time, be capable of a greatly extended useful life in the activated condition.

Another object is to produce such a cell which will provide a higher degree of voltage regulation throughout its useful life.

Another object is to produce such a cell which may be readily utilized in multi-cell battery constructions and which may be activated either by adding liquid ammonia or ammonia in the vapor state.

These objects are attained by providing in such a galvanic cell a lead anode, a lead dioxide cathode, and an electrolyte consisting of a solute dissolved in ammonia, at least the major constituent of said solute being a metal salt or mixture of such salts which is directly soluble in liquid ammonia, or deliquescent to ammonia vapor, the cation metal or metals of said salt or salts having an electrode potential in liquid ammonia no greater than that of lead in liquid ammonia.

Further objects and advantages will become apparent from the following description and claims particularly when considered in the light of the accompanying drawing wherein:

Figure 1:
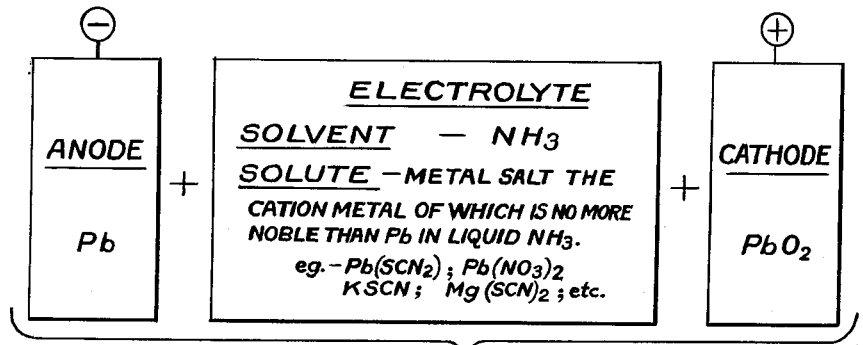
FIG. 1 is a block diagram showing the characteristics of the basic components of my improved cell.

As shown in FIG. 1 my improved galvanic cell comprises a lead anode and a lead dioxide cathode in contact with an electrolyte consisting essentially of ammonia ($NH_3$) as the solvent, and a solute, at least the major constituent of which is a metal salt or combination of metal salts, soluble in liquid ammonia, the cation metal or metals of which being no more noble than (having an electrode potential not greater than that of) lead in liquid $NH_3$.

One known advantage of the ammonia type battery or cell is that it may readily be constructed in a form which permits activation merely by the introduction of gaseous ammonia thereinto. When this type of activation is to be employed, the salt or salts utilized should therefore be deliquescent of gaseous ammonia. If, on the other hand, activation is to be by the introduction of liquid ammonia, the salt or salts used need not be deliquescent to gaseous $NH_3$ but should, of course, be soluble in liquid $NH_3$.

As an example of metal salts which have been found suitable for use in such cells are the following:

Lead thiocyanate—$Pb(SCN)_2$
Lead perchlorate—$Pb(ClO_4)_2$
Lead fluoborate—$Pb(BF_4)_2$
Potassium thiocyanate—$KSCN$
Magnesium thiocyanate—$Mg(SCN)_2$
Lead nitrate—$Pb(NO_3)_2$
Lead acetate—$Pb(C_2H_3O_2)_2$ All of the above salts are deliquescent to gaseous ammonia and are therefore particularly well adapted for use where vapor activation is to be employed. However, othre salts which fulfill the above-discussed requirements may likewise be used, especially where ammonia in liquid rather than gaseous form is to be introduced for activation of the cell.

Particularly where gaseous activation is to be utilized it is preferred that the electrolyte salt be in a condition such that it may readily absorb the $NH_3$ vapor and go into solution therewith directly between the anode and cathode plates of the cell. This result may be readily attained by impregnating porous material, such as a pad of one or more sheets of filter paper or the like, with the solute salt, and sandwiching this impregnated pad directly between the adjacent anode and cathode plates of the cell. While many suitable materials are available for such purpose, a paper designated as No. 048 absorbent paper available from Eaton-Dikeman Paper Co. has been found well suited for this use. This paper, which is about .007″ in thickness, permits a very thin sandwich construction where desired and yet is sufficiently permeable to the gaseous ammonia that the latter may come quickly into contact with the salt impregnated therein to produce a conducting ionized electrolyte solution to place the cell in operation. Pads made from a thicker (.015″) paper designated as No. 629, available from the same manufacturer are also well adapted for this use where extreme compactness is of less importance.

As the anodes and cathodes, any known method of fabricating these elements may be employed. Thus, they may conveniently be formed by electro-plating the lead and lead-dioxide materials, respectively, directly on appropriately shaped supporting plates of stainless steel. While use of a nickel flash to facilitate such electro-plating is permissible in the case of the lead anode, it should not be utilized in forming the lead-dioxide cathodes, since the latter material is inherently somewhat porous and would permit the ammonia to come into contact with the nickel flash, which is soluble in ammonia, causing rapid loss of adhesion to the supporting-plate and subsequent deterioration of the cell.

Either aluminum or stainless steel is well adapted for use as the container or casing for such a cell and also as the intercell electrical connectors, terminals, etc., since these materials are highly resistant to corrosion by ammonia.

Insulators, where necessary, may be molded or otherwise suitably formed from such materials as polyethylene, glass, nylon, certain polyesters or chloropolyethers. Since cells of the type under consideration are preferably highly evacuated during storage and are under rather high internal pressure when activated, seals and insulation material around the terminals or in openings in the casing must be capable of withstanding a considerable pressure differential in either direction.

Figure 2:
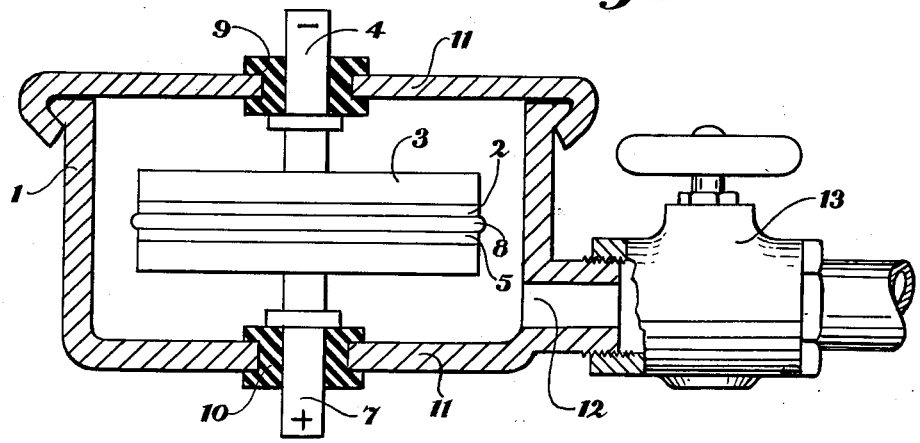
FIG. 2 is a sectional view of a galvanic cell utilizing my invention.

To further illustrate the basic construction of a cell according to my invention, there is shown in FIG. 2 an elementary cell capable of activation by the introduction of gaseous ammonia. In order to more clearly show the individual elements of such a cell, the relative dimensions, and particularly the thicknesses of the various components have been greatly exaggerated.

The cell comprises a suitable casing or container 1 of aluminum or stainless steel. A lead anode 2 is carried by a suitable stainless steel anode support 3 electrically connected to the negative or anode terminal 4 of the cell. Spaced slightly from anode 2 is a cathode 5 of lead dioxide likewise carried by a suitable stainless steel cathode support 6 connected to the positive or cathode terminal 7 of the cell. Interposed between anode 2 and cathode 5 is a pad 8 of porous paper or similar material which has been impregnated with the solute salt, which in this case will be considered to be lead thiocyanate, $Pb(SCN)_2$. The terminal posts 4 and 7 extend through suitable insulators 9 and 10 carried by the end walls 11 of the housing.

Container 1 should be air-tight and capable of withstanding considerable pressure. The interior of the casing 1 is preferably evacuated at the time of manufacture of the cell and is maintained in this condition until the cell is activated. This decreases any tendency for corrosion to take place inside the cell, thereby greatly extending the inactivated shelf life thereof, and also facilitates the introduction of $NH_3$ into the cell to activate it. To permit such evacuation of the cell and subsequent introduction of the electrolyte solvent, there is provided a port 12, communicating with the interior of casing 1 and controlled by a suitable valve 13.

When ammonia vapor is introduced through port 12 into the previously evacuated casing 1, the ammonia will rapidly permeate the porous pad 8 and come into contact with the lead thiocyanate salt with which it is impregnated. The lead thiocyanate will thereupon, like any deliquescent material, cause a condensation of the ammonia vapor on the surface of the crystals thereof which will thereupon dissolve in the liquid ammonia to produce the required ionized salt-in-ammonia solution.

A single cell of this type, upon activation, produces an output potential of approximately 0.75 volt and will furnish useful current until substantial exhaustion of either the lead or lead dioxide electrode. Throughout the major portion of this time the output potential will remain within 10% of its initial value. Current capacities of better than 220 coulombs per sq. in. of effective cell area are attainable. The life of the cell in its activated condition, when under no load or very small load, is several days as compared to the relatively few hours or minutes that prior cells of this general type would remain effective in their activated conditions.

The following working examples are typical of ammonia vapor activated (AVA) cells constructed in accordance with the principles of my invention and utilizing various lead salts as the electrolyte solute. In each case the cell was, of course, housed in a suitable gas-tight housing.

EXAMPLE I

*Long-life, low current-density AVA $Pb/Pb(SCN)_2/PbO_2$ annular single cell*

DESCRIPTION OF COMPONENTS

| | |
|---|---|
| Electrolyte pad (30D)[1] | 90.2 mg./in.$^2$ $Pb(SCN)_2$. |
| Anode | Solid Pb foil (0.005 inch). |
| Cathode [2] | $PbO_2$ (260 mg./in.$^2$). |
| Geometry | Annular plates and pads each having area of 0.917 in.$^2$. I.D.=0.775 in. O.D.=1.330 in. |

[1] Eaton and Dikeman #629 absorbent paper (0.012 inch thick) impregnated from an ammoniacal solution of $Pb(SCN)_2$ (Baker purified grade) 30% by weight.
[2] Lead dioxide electroplated on 0.004 inch stainless steel from a $Pb(NO_3)_2$ bath without conventional nickel flash.

TEST CONDITIONS

| | |
|---|---|
| Temperature | 75±5° F. |
| $NH_3$ activation pressure | 150±5 p.s.i.g. |
| Load (constant) | 1.64 ma./in.$^2$. |

RESULTS

| | |
|---|---|
| Maximum voltage | 0.80 volt. |
| Cut-off voltage | 0.50 volt. |
| Life | 35⅓ hours. |
| Capacity | 210 coulombs/in.$^2$. |
| Efficiency (based on limiting $PbO_2$) | Approximately 100%. |

| Life, hours: | Volts |
|---|---|
| 0 | 0.80 |
| 2 | 0.78 |
| 10 | 0.75 |
| 24 | 0.74 |
| 32 | 0.73 |
| 34 | 0.70 |
| 35⅓ | 0.50 |

It should be noted that the cell output voltage had dropped less than 10% at the end of 32 hours under load and only 12½% at the end of 34 hours.

EXAMPLE II

*A long-life, programmed-load annular AVA $Pb/Pb(SCN)_2/PbO_2$ single-cell, assembled from a $Pb(SCN)_2$ impregnated pad, prepared by the precipitation method from $Pb(NO_3)_2$*

DESCRIPTION OF COMPONENTS

| | |
|---|---|
| Electrolyte pad (10D)[1] | 12.2 mg./in.$^2$ $Pb(SCN)_2$. |
| Anode | Solid Pb foil (0.005 in.). |
| Cathode: similar to Ex. 1 | $PbO_2$ 200–250 mg./in.$^2$. |
| Geometry | Annular plates and pads having an area of 0.917 in.$^2$. |

[1] Eaton and Dikeman #629 absorbent paper (0.012 inch thick) impregnated from an aqueous 10% solution of $Pb(NO_3)_2$; damp-dried; soaked in a 50% solution of KSCN to precipitate $Pb(SCN)_2$ within the paper; washed to remove excess $SCN^-$, $Pb^{++}$, etc.; and dried.

TEST CONDITIONS

| | |
|---|---|
| Temperature | 75±5° F. |
| $NH_3$ activation pressure | 125±5 p.s.i.g. |

Load cycle: Light drain: 500 ohms (≈1.46 ma./in.$^2$) for 18 min.; then heavy drain: 250 ohms (≈2.60 ma./in.$^2$) for 2 min.; cycle repeated continuously.

RESULTS

| | |
|---|---|
| Maximum voltage | 0.72 (light load), 0.66 (heavy load). |
| Cut-off voltage | 0.55 (light load), 0.49 (heavy load). |
| Life | 25 hours. |
| Total capacity | 170 coulombs/in.$^2$. |
| Efficiency | 85%. |

| Time, hours | VOLTAGE (VOLTS) | |
|---|---|---|
| | Light load | Heavy load |
| 0 | 0.72 | 0.66 |
| 4 | 0.68 | 0.65 |
| 10 | 0.68 | 0.66 |
| 16 | 0.67 | 0.66 |
| 22 | 0.66 | 0.64 |
| 24 | 0.62 | 0.60 |
| 25 | 0.55 | 0.49 |

This cell was very similar to the cell of Example I except for the manner in which the electrolyte salt was incorporated into the pad. Note that while the average load was approximately the same as in Example I, it was cyclically varied between heavy and light values throughout the test period.

EXAMPLE III

*Long-life, low current-density AVA $Pb/Pb(NO_3)_2/PbO_2$ annular single cell*

DESCRIPTION OF COMPONENTS

Electrolyte pad (20–048)[1] ____ 25.5 mg./in.$^2$ $Pb(NO_3)_2$.
Anode _____ Solid Pb foil (0.005 in.).
Cathode: similar to Example I. $PbO_2$ (259 mg./in.$^2$).
Geometry of cell _____ Annular: Area=0.917 in.$^2$.

[1] Eaton and Dikeman #048 absorbent paper (0.007 inch thick) impregnated from a 20% aqueous solution of $Pb(NO_3)_2$.

TEST CONDITIONS

Temperature _____ 75±5° F.
$NH_3$ activation pressure _____ 125±5 p.s.i.g.
Load (constant) _____ 0.55 ma./in.$^2$.

RESULTS

Maximum voltage _____ 0.75 volt.
Cut-off voltage _____ 0.50 volt.
Life _____ 96⅔ hours.
Capacity _____ 191 coulombs/in.$^2$.
Efficiency (based on limiting $PbO_2$) _ 75%.

| Life, hours: | Volts |
|---|---|
| 0 | 0.70 |
| 4 | 0.74 |
| 10 | 0.68 |
| 50 | 0.67 |
| 74 | 0.75 |
| 90 | 0.73 |
| 94 | 0.68 |
| 96 | 0.55 |
| 96⅔ | 0.50 |

Note the exceptionally good voltage regulation for the first 94 hours under load.

EXAMPLE IV

*An AVA $Pb/Pb(BF_4)_2/PbO_2$ single-cell*

DESCRIPTION OF CELL COMPONENTS

Electrolyte pad[1] _____ 50–048.
Anode _____ Lead foil.
Cathode: (similar to Example I) __ 300 mg./in.$^2$ $PbO_2$.
Geometry _____ Annular: Area=0.917 in.$^2$.

[1] Eaton and Dikeman #048 absorbent paper impregnated with 25 mg./in.$^2$ $Pb(BF_4)_2$.

TEST CONDITIONS

Temperature _____ 75±5° F.
$NH_3$ activation _____ 160 p.s.i.g.
Load (constant) _____ 1.64 ma./in.$^2$.

RESULTS

Maximum voltage _____ 0.75 volt.
Cut-off voltage _____ 0.50.
Life _____ 9 hours.
Capacity _____ 53 coulombs/in.$^2$.

| Life, hours: | Volts |
|---|---|
| 0 | 0.75 |
| 1 | 0.72 |
| 2 | 0.68 |
| 3 | 0.65 |
| 4 | 0.63 |
| 6 | 0.59 |
| 8 | 0.53 |
| 9 | 0.50 |
| 10 | 0.30 |

The following working examples are illustrative of AVA cells using salts the cation metal of which has an electrode potential in liquid ammonia which is less than that of lead in liquid ammonia.

EXAMPLE V

*An annular single-cell comprised of the AVA $Pb/Mg(SCN)_2/PbO_2$ system*

CELL COMPONENTS

Anode _____ Solid lead foil.
Cathode: (electroplated on stainless steel) _____ $PbO_2$—300 mg./in.$^2$.
Electrolyte pad (30D)[1] _____ 58.2 mg./in.$^2$ $Mg(SCN)_2$.

[1] Eaton and Dikeman's #629 absorbent paper impregnated from a 30% by wt. aqueous solution of $Mg(SCN)_2$.

TEST CONDITIONS

Geometry _____ Annular: cell area=0.917 in.$^2$.
Temperature _____ 75±5° F.
$NH_3$ activation pressure _____ 150±5 p.s.i.g.
Load (constant) _____ 1.5 ma./in.$^2$.

RESULTS

Maximum voltage _____ 0.79.
Cut-off voltage _____ 0.5.
Life _____ 5½ hours.
Capacity _____ 32.5 coulombs/in.$^2$.
Efficiency _____ 25%.

| Time: | Volts |
|---|---|
| 0 min. | 0.79 |
| 20 min. | 0.77 |
| 1 hour | 0.74 |
| 2 hours | 0.70 |
| 3 hours | 0.65 |
| 4 hours | 0.65 |
| 5 hours | 0.63 |
| 5½ hours | 0.50 |

EXAMPLE VI

*An annular single-cell assembled to form an AVA Pb/KSCN in $NH_3/PbO_2$*

CELL COMPONENTS

Electrolyte pad (20B)[1] _____ 22.4 mg./in.$^2$ KSCN.
Anode _____ Pb foil.
Cathode _____ 300 mg./in.$^2$ $PbO_2$.

[1] Eaton and Dikeman's #1495 absorbent paper (0.009 inch thick) impregnated from a 20% solution of KSCN.

TEST CONDITIONS

Cell geometry (I.D.=0.850 in.; O.D. 1.330 in.) _____ Annular: cell area=0.82 in$^2$.
Temperature _____ 75±5° F.
$NH_3$ activation pressure _____ 150 p.s.i.g.
Load (constant) _____ 1.86 ma./in.$^2$.

RESULTS

Maximum voltage _____ 0.78 volt.
Cut-off voltage _____ 0.45.
Life _____ 26⅔ hours.
Capacity _____ 179 coulombs/in.$^2$.
Efficiency _____ 75%.

| Time, hours: | Volts |
|---|---|
| 0 | 0.78 |
| 1 | 0.75 |
| 8 | 0.75 |
| 10 | 0.74 |
| 14 | 0.70 |
| 18 | 0.68 |
| 22 | 0.70 |
| 24 | 0.68 |
| 26 | 0.58 |
| 26⅓ | 0.55 |
| 26⅔ | 0.45 |

In each of the above examples the electrolyte solute has consisted of a single metal salt. It is, of course, possible, without departing from the spirit and scope of my invention, to utilize mixtures of such salts so long as the salts are compatible and the cation metals of the salts are, as previously discussed, no more noble than lead in liquid ammonia.

Moreover, it is possible to use a solute containing, with such metal salts, minor amounts of certain nonmetal salts such as $NH_4SCN$ or $NH_4NO_3$ while still retaining the long activated-stand life and the improved voltage-time discharge characteristic which are typical of cells made in accordance with my invention. Such nonmetal salt additives tend to reduce somewhat the internal resistance of the cell and therefore permit somewhat greater current discharge rates without undue drop in output voltage. However, the nonmetal salt additive should not constitute more than about 30% by weight of the total solute salt content, since amounts in excess of this tend to cause a marked deterioration in the voltage-time discharge characteristics of the cell. The following example is illustrative of such a cell. In this particular case the complete electrolyte solution was introduced in liquid form into a housing containing the anode and cathode elements to activate the cell. No electrolyte pad was utilized.

EXAMPLE VII

*Long-life, low-rate $Pb/NH_4NO_3+Pb(NO_3)_2/PbO_2$ liquid system cell*

DESCRIPTION OF COMPONENTS

Electrolyte
- 5% by wt. $NH_4NO_3$.
- 45% by wt. $Pb(NO_3)_2$.
- 50% by wt. $NH_3$.

Anode [1] _____ Pb 315 mg./in.$^2$.
Cathode _____ $PbO_2$—300 mg./in.$^2$.

[1] Lead electroplated from a lead fluoborate bath onto 0.004 inch stainless steel with a nickel flash undercoating.

TEST CONDITIONS

Cell construction: Electrode strips ⅝″ wide and 3″ long, both sides masked and sealed with 3M #470 Electroplaters tape, with 0.2 in.$^2$ active area exposed on both anode and cathode. Electrode spacing 0.030 inch.
Temperature: −28.3° F.
Load (constant): 0.273 ma./in.$^2$.

TEST RESULTS

Maximum voltage _____ 0.72.
Cut-off voltage _____ 0.53.
Life _____ 231 hours (9½ days).
Capacity _____ 228 coulombs/in.$^2$.
Efficiency _____ Approx. 95%.

| Time: | Volts |
|---|---|
| 0 hours | 0.69 |
| 3 hours | 0.70 |
| 24 hours | 0.72 |
| 48 hours | 0.70 |
| 120 hours (5 days) | 0.68 |
| 168 hours (7 days) | 0.66 |
| 192 hours | 0.62 |
| 216 hours (9 days) | 0.59 |
| 231 hours | 0.53 |
| 234 hours | 0.16 |

Note that the nonmetal solute salt ($NH_4NO_3$) constituted but 10% of the total solute and that the solute was therefore predominately a metal salt having the characteristics previously discussed in detail above. This example also incidentally illustrates the well-known ability of ammonia type cells to deliver useful voltages and currents under very low temperature conditions.

FIG. 2 is intended merely to illustrate the general principles involved in the construction of a cell of this type and should in no way be considered as limiting. Particularly when vapor activation is to be utilized, extreme flexibility of the mechanical design and construction of cells or batteries of cells is permitted. Obviously, like most galvanic cells, it is possible to construct batteries consisting of a plurality of cells in a single container, connected in parallel with one another to provide greater current-producing capacity, or in series with one another to produce multiples of the basic cell voltage. Obviously too, series-parallel combinations may be utilized.

Figure 3:
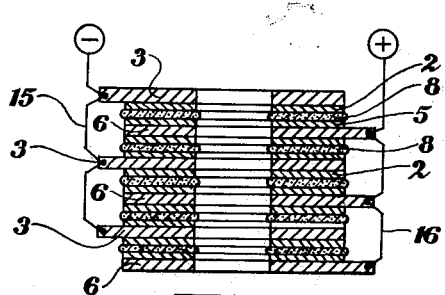
FIG. 3 is a diagrammatic view illustrating the manner in which a plurality of cells made in accordance with my invention may be electrically connected in parallel to provide increased current supplying capacity.

FIG. 3 is a diagrammatic showing of one way of forming a compact assembly of cells of annular configuration connected in parallel. In such a construction the anode supports 3 are connected in parallel with one another as by conductor 15. All of the anode supports except the end or upper one are plated on both sides with the desired lead anode material 2. Similarly, the cathode supports 6 are plated with lead dioxide cathode material 5 on both sides while the salt impregnated pads 8 are interposed between adjacent anode and cathode surfaces. Like the anode supports 3, the cathode supports 6 are connected in parallel to one another as by conductor 16 so that the total current-producing capacity of a cell formed as in FIG. 3 would be substantially five times that of a single cell.

Figure 4:
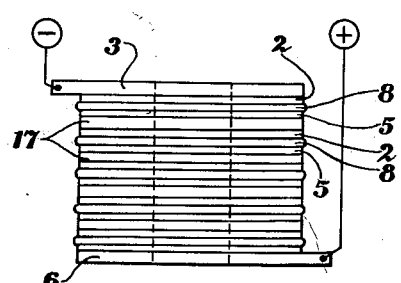
FIG. 4 is a similar view showing a series arrangement of such cells to obtain a higher output voltage.

FIG. 4 shows a similar cell stack with the cells arranged in series with one another to produce a voltage five times greater than that of the basic cell. In this case the intermediate supporting plates 17 may conveniently be plated on one side with $PbO_2$ cathode material 5 and on the other side with Pb anode material 2, the output voltage being taken from the upper anode support 3 and the lower cathode support 6.

Obviously multi-cell constructions as in FIGS. 3 and 4 should be housed in a suitable container (not shown). With this general type of construction multi-cell units have been made which are capable of supplying in excess of 2.5 watt-hours of electrical energy per cubic inch of cell volume.

As previously indicated, the type of construction shown in FIGS. 2–4 is for illustrative purposes only and should not be considered as restrictive. The broad principles of the invention are obviously equally applicable to cells designed to be activated by the introduction of liquid ammonia (where the electrolyte salt is already in the cell) or by introduction of the complete salt-in-ammonia electrolyte solution as described in conjunction with working Example VII. The activating material, whether gaseous or liquid, may be introduced from a separate container or may be carried within a suitable compartment within the cell container itself, but kept isolated from the anode and cathode until such time as the cell is to be activated. Such arrangements have hitherto been used in the battery art with cells utilizing other electromechanical materials and do not, per se, form part of the instant invention.

Obviously, many variations and modifications of the specific arrangements shown and described for illustrative purposes may be made without departing from the spirit and scope of the invention as defined by the appended claims.

I claim:

1. A galvanic cell comprising a lead anode, a lead dioxide cathode and an electrolyte common to both said anode and said cathode and consisting essentially of ammonia and a solute soluble in liquid ammonia, at least the major constituent of said solute being a metal salt, the cation metal of said salt having an electrode potential in liquid ammonia which is not greater than that of lead in liquid ammonia.

2. A galvanic cell as set forth in claim wherein said salt is a metal thiocyanate.

3. A galvanic cell as set forth in claim 1 wherein said salt is magnesium thiocyanate.

4. A galvanic cell as set forth in claim 1 wherein said salt is potassium thiocyanate.

5. A galvanic cell comprising a lead anode, a lead dioxide cathode and an electrolyte common to both said anode and said cathode and consisting essentially of ammonia and a solute deliquescent to ammonia vapor and soluble in liquid ammonia, at least the major constituent of said solute being a metal salt the cation metal of said salt having an electrode potential in liquid ammonia which is not greater than that of lead in liquid ammonia.

6. A galvanic cell comprising a lead anode, a lead dioxide cathode and an electrolyte common to both said anode and said cathode and consisting essentially of ammonia and a lead salt soluble in liquid ammonia.

7. A galvanic cell comprising a lead anode, a lead dioxide cathode and an electrolyte common to both said anode and said cathode and consisting essentially of ammonia and a lead salt which is deliquescent to ammonia vapor and soluble in liquid ammonia.

8. A galvanic cell as set forth in claim 7 wherein said salt is lead thiocyanate.

9. A galvanic cell as set forth in claim 7 wherein said salt is lead nitrate.

10. A galvanic cell as set forth in claim 7 wherein said salt is lead fluoborate.

11. A galvanic cell, normally inactive, but adapted to be activated by the introduction of ammonia into said cell, comprising a lead anode, a lead dioxide cathode, and an electrolyte solute interposed between said anode and said cathode, at least the major constituent of said solute being a metal salt soluble in liquid ammonia, the cation metal of said salt having an electrode potential in liquid ammonia which is not greater than that of lead in liquid ammonia, and means for introducing ammonia into contact wtih said solute to activate said cell.

12. A galvanic cell as set forth in claim 11 wherein said solute is deliquescent to ammonia vapor and wherein said ammonia introduced to activate said cell is in the form of ammonia vapor.

13. In a galvanic cell of the type having an anode, a cathode, and an electrolyte including a solute which is normally inactive with respect to said anode and cathode and which is adapted to be rendered electrochemically active by the introduction of ammonia into contact therewith, the improvement wherein said anode is formed of lead, said cathode is formed of lead dioxide and at least the major constituent of said solute is a salt of a metal having an electrode potential in liquid ammonia which is no greater than that of lead in liquid ammonia, said salt being soluble in liquid ammonia.

14. In a galvanic cell as in claim 13 the further improvement wherein said salt is deliquescent to ammonia vapor, whereby said cell may be activated by the introduction of ammonia in vapor form into contact with said salt.

15. A galvanic cell, normally inactive, but adapted to be activated by the introduction of ammonia into said cell, comprising a lead anode, a lead dioxide cathode, and an electrolyte solute interposed between said anode and said cathode, at least the major constituent of said solute being a metal salt soluble in liquid ammonia, the cation metal of said salt having an electrode potential in liquid ammonia which is not greater than that of lead in liquid ammonia, and means for introducing ammonia into contact with said solute to activate said cell.

References Cited in the file of this patent

UNITED STATES PATENTS

| | | |
|---|---|---|
| 2,609,408 | Heise et al. | Sept. 2, 1952 |
| 2,863,933 | Minnick et al. | Dec. 9, 1958 |

UNITED STATES PATENT OFFICE
CERTIFICATE OF CORRECTION

Patent No. 3,009,007                      November 14, 1961

Vivian M. Bryant, Jr.

It is hereby certified that error appears in the above numbered patent requiring correction and that the said Letters Patent should read as corrected below.

Column 9, line 5, after "claim" insert reference numeral -- 1 --.

Signed and sealed this 17th day of April 1962.

(SEAL)
Attest:

ESTON G. JOHNSON

Attesting Officer

DAVID L. LADD

Commissioner of Patents